United States Patent Office 2,913,173
Patented Nov. 17, 1959

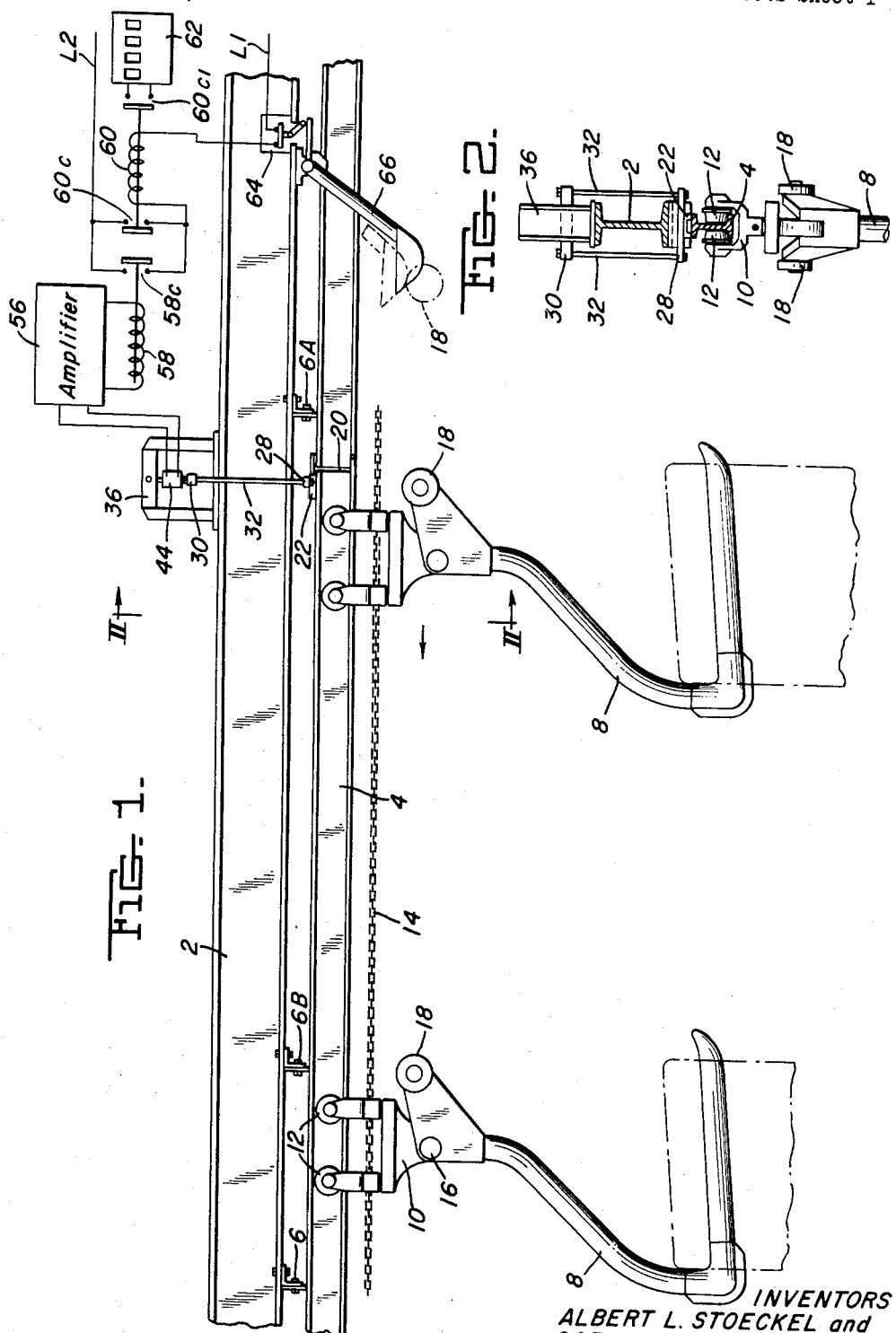

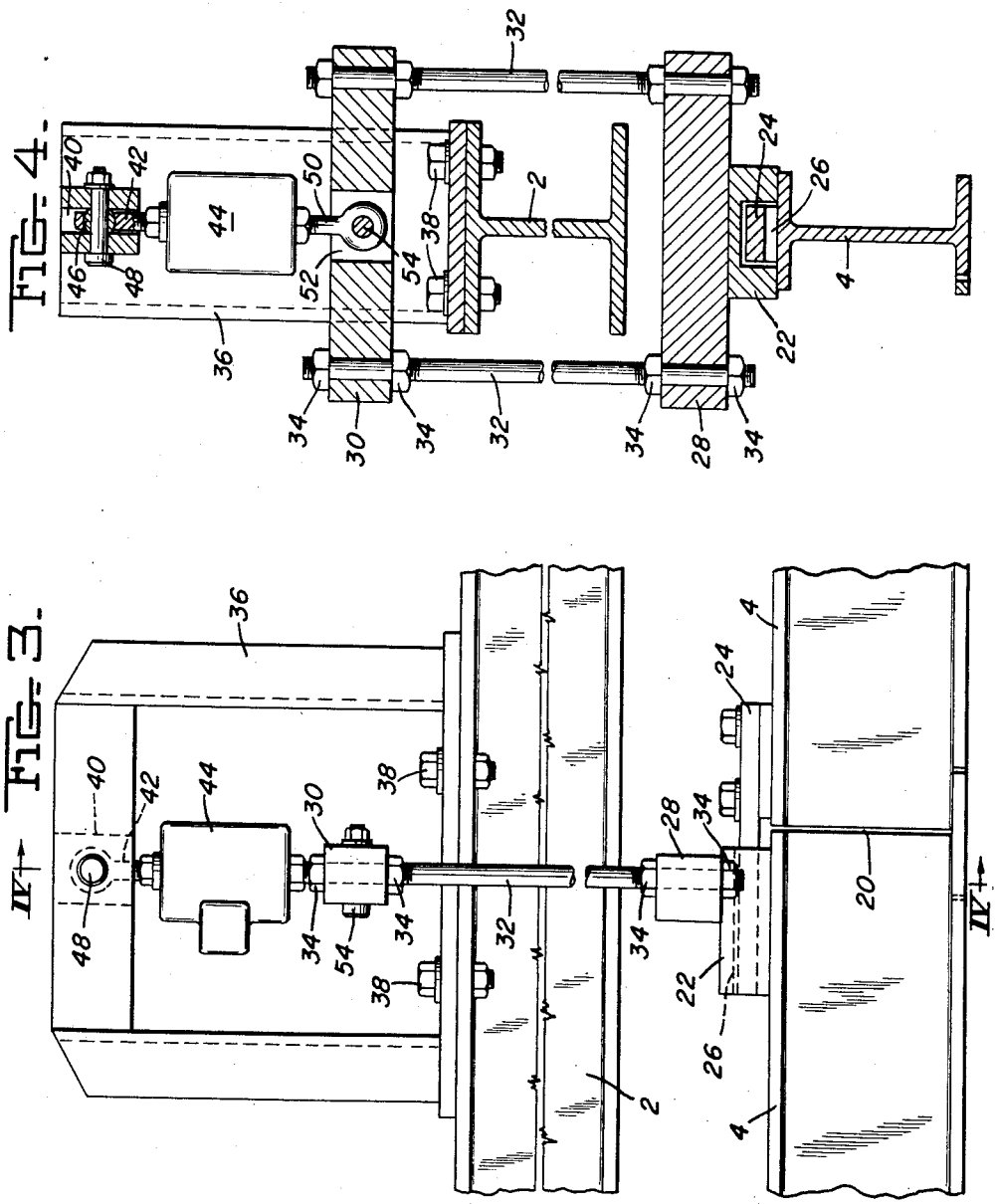

2,913,173

APPARATUS FOR COUNTING BUNDLES MOVING ALONG A CONVEYOR

Albert L. Stoeckel, Euclid, and Carl T. Zimmermann, Cleveland Heights, Ohio, assignors to United States Steel Corporation, a corporation of New Jersey Application March 11, 1957, Serial No. 645,349

4 Claims. (Cl. 235—98)

This invention relates to apparatus for counting bundles moving along a conveyor and more particularly to the counting of bundles of rod or wire supported from the hooks of a monorail conveyor. The hooks are located in spaced relation on the conveyor and in many instances bundles are not supported on all hooks. Thus, when it is desired to count the bundles, an ordinary counter cannot be used since the unloaded hook would actuate the counter as well as a loaded hook. Furthermore, if the bundle is much less than a full-weight bundle, it is not desired to count the bundle. With the counters previously used, a correct count of bundles could not be made.

It is therefore an obect of our invention to provide a counter for counting moving bundles on a conveyor which will not count unloaded or only partially loaded hooks.

This and other objects will be more apparent after referring to the following specification and attached drawings, in which:

Figure 1 is an elevation of a monorail conveyor showing our invention incorporated therein;

Figure 2 is a view taken on the line II—II of Figure 1;

Figure 3 is an enlarged detail view of a portion of the apparatus shown in Figure 1; and Figure 4 is a view taken on the line IV—IV of Figure 3.

Referring more particularly to the drawings, the reference numeral 2 indicates a support beam from which a conveyor beam 4 is supported at spaced intervals by means of hangers 6, 6A and 6B. Hooks 8 are supported from the beam 4 by means of a bracket 10 having flanged wheels 12 which are received and supported by the lower flanges of the beam 4. A chain 14 is attached to the brackets 10 so as to space the hooks 8 at regular intervals. The parts so far described are conventional. Each of the hooks 8 is supported by means of a pin 16 attached to the bracket 10 so that the hooks can move about a horizontal axis. A switch actuator 18 is also mounted for movement about the pivot pin 16. At the counting station, the beam 4 is cut on a bias at 20 adjacent the support 6A to provide a break in the beam. Thus, the section of the beam 4 between the next succeeding bracket 6B and the cut 20 functions as a flexible cantilever beam. An inverted U-shaped member 22 is welded to the free end of beam 4 with a plate 24 extending into opening 26 of the inverted U-shaped member. The thickness of the plate 24 is considerably less than the height of the opening 26 so that, under normal conditions, the plate 24 will not contact either the beam 4 or the inverted U-shaped member 22. The plate 24 is attached to the beam 4 on the opposite side of the cut 20. This prevents undue deflection of the beam 4 adjacent the break 20 under abnormal conditions. A plate 28 is welded to the inverted U-shaped member 22 and extends beyond the flanges of beam 2. A plate 30 is supported above the beam 2 by means of rods 32 extending upwardly from and supported by the plate 28. The ends of the rods 32 are threaded and pass through holes in the plates 28 and 30 with adjusting nuts 34 serving to hold the plate 30 in the desired position. A bracket 36 is attached to the upper flange of beam 2 in any suitable manner such as by means of bolts 38. An opening 40 is provided in the top of bracket 36 for receiving an arm 42 which carries a load cell 44. The load cell 44 may be of any conventional type such as a "Baldwin SR-4" shown on pages 5 and 8 of Baldwin-Lima-Hamilton Corporation Bulletin 4301 and produces an output signal proportional to the amount of load. Suitable load cells and parts thereof are also shown in U. S. Patents 2,292,549, 2,322,319, 2,350,972, 2,390,038, 2,472,047, 2,488,348, 2,561,318 and Re. 22,589. The arm 42 is supported by a spherical bearing 46 carried by a pin 48. An arm 50 extends downwardly from the load cell 44 into an opening 52 in the plate 30. The arm 50 is pivotally mounted on a pin 54 carried by the plate 30. Thus, the free end of the cantilevered section of the beam 4 is supported from the beam 2 by means of the load cell 44. The spherical bearing 46 and pivot support 54 prevent any torsion forces on the load cell 44 so that the load cell will be under pure tension. The output of load cell 44 is connected to an amplifier 56 which controls a relay coil 58 having a normally open contact 58C. A relay coil 60 is connected in series with contacts 58C and is supplied with current from power source L1—L2. The relay coil 60 is provided with normally open contact 60C which is arranged in parallel with contacts 58C and contact 60C1 which is normally open but which will close for a very short time when the relay coil 60 is energized. The contact 60C1 is arranged in circuit with a counter 62 which will be actuated each time the contact 60C1 closes. A normally closed switch 64 is arranged in series with relay coil 60. The switch 64 is mounted on beam 2 on the approach side of hanger 6A a distance less than the distance between hangers. The switch 64 is operated by means of a pivotally mounted arm 66 which extends downwardly into the path of travel of actuator 18. The distance between hooks 8 is preferably at least as great as the length of the cantilevered portion of beam 4 to provide for best operation.

The operation of our device is as follows:

The amplifier 56 is adjusted so that the relay 60 will operate the counter 62 when a minimum load is applied to the load cell. This minimum load will be greater than the weight of hook 8 with its supporting structure and may be set, for example, to operate at 400 pounds. When a hook 8 with a bundle of rod thereon passes from the main section of beam 4 to the end of the cantilevered portion of beam 4, the load cell 44 will put out a voltage signal which is amplified by amplifier 56 and will momentarily energize relay coil 58 to close its contacts 58C. This will energize relay coil 60, thus closing its contact 60C to hold the coil 60 energized and momentarily closing contact 60C1 which applies a count to counter 62. When the next hook 8 comes along, it will strike lever arm 66, thus momentarily opening switch 64 and deenergizing relay coil 60. This resets the circuit so that it can be actuated by movement of the load onto the load cell 44. The purpose of the switch 64 is to prevent operation of the counter 62 twice for one load in case the conveyor stops moving when a loaded bundle is on the cantilevered section of the beam 4 or in case of power failure.

While one embodiment of our invention has been shown and described it will be apparent that other adaptations and modifications may be made without departing from the scope of the following claims.

We claim:

1. Apparatus for counting loaded carriers moving along a conveyor comprising a beam for supporting said carriers, a break in said beam, a support for said beam adjacent said break on the approach side thereof, a support for said beam on the exit side of said break a distance no greater than the distance between carriers, a load cell attached to said beam adjacent said break on the exit side thereof, a counter adapted to be operated by the output of said load cell when a loaded carrier is supported thereby, a circuit between said load cell and said counter, and a switch adapted to be actuated when a carrier approaches said break to reset the circuit between said load cell and counter.

2. Apparatus for counting loaded carriers moving along a monorail conveyor comprising a beam for supporting said carriers, a break in said beam, a support for said beam adjacent said break on the approach side thereof, a support for said beam on the exist side of said break a distance no greater than the distance between carriers, means for preventing undue deflection of the beam adjacent said break, a load cell attached to said beam adjacent said break on the exit side thereof, a counter adapted to be operated by the output of said load cell when a loaded carrier is supported thereby, a circuit between said load cell and said counter, and a switch adapted to be actuated when a carrier approaches said break to reset the circuit between said load cell and counter.

3. Apparatus for counting loaded carriers moving along a monorail conveyor comprising a beam for supporting said carriers, a break in said beam, a support for said beam adjacent said break on the approach side thereof, a support for said beam on the exit side of said break a distance no greater than the distance between carriers, means for preventing undue deflection of the beam adjacent said break, a load cell attached to said beam adjacent said break on the exit side thereof, an amplifier attached to the output of said load cell, a relay operable by said amplifier, said relay having a normally closed contact, a relay coil in series with said normally closed contact, said relay coil having a normally open contact in parallel with said normally closed contact and a normally open contact adapted to be closed momentarily, a normally closed switch in series with said relay coil, means for opening said switch when a carrier approaches said break in the beam, and a counter actuated by the closing of said last named normally open contact.

4. Apparatus for counting loaded carriers moving along a conveyor comprising a first member, a second member aligned with the first member with one end thereof adjacent an end of the first member, said members supporting said moving carriers, a support for the adjacent end of the first of said members, a support for the second of said members remote from its adjacent end, the distance of said second support from its adjacent end being no greater than the distance between carriers, a load cell attached to said second member adjacent its said end, and a counter adapted to be operated by the output of said load cell when a loaded carrier is supported thereby.

References Cited in the file of this patent

UNITED STATES PATENTS

| | | |
|---|---|---|
| 1,513,811 | Heinold | Nov. 4, 1924 |
| 2,029,271 | Messiter | Jan. 28, 1936 |
| 2,340,213 | Ellsworth | Jan. 25, 1944 |